US012676063B2

(12) United States Patent
Platt et al.

(10) Patent No.: US 12,676,063 B2
(45) Date of Patent: Jul. 7, 2026

(54) SYSTEMS, DEVICES AND METHODS FOR FALL DETECTION

(71) Applicant: Inovonics Wireless Corporation, Westminster, CO (US)

(72) Inventors: Christopher L. Platt, Erie, CO (US); Sumit Sur, Broomfield, CO (US); Jess E. Cobb, Lafayette, CO (US); Rashid S. Al-Hamoodah, Longmont, CO (US); Lalit S. Pandit, Fort Collins, CO (US); Todd A. Stanley, Broomfield, CO (US)

(73) Assignee: Inovonics Wireless Corporation, Westminster, CO (US)

( * ) Notice: Subject to any disclaimer, the term of this patent is extended or adjusted under 35 U.S.C. 154(b) by 86 days.

(21) Appl. No.: 18/164,731

(22) Filed: Feb. 6, 2023

(65) Prior Publication Data

US 2023/0252881 A1 Aug. 10, 2023

Related U.S. Application Data

(60) Provisional application No. 63/307,337, filed on Feb. 7, 2022.

(51) Int. Cl.

*G08B 29/18* (2006.01)
*G08B 21/04* (2006.01)
*G08B 25/00* (2006.01)

(52) U.S. Cl.

CPC ......... *G08B 29/185* (2013.01); *G08B 21/043* (2013.01); *G08B 21/0446* (2013.01); *G08B 25/001* (2013.01)

(58) Field of Classification Search

CPC ............... G08B 29/185; G08B 21/043; G08B 21/0446; G08B 25/001; G08B 25/009; G08B 29/188

See application file for complete search history.

(56) References Cited

U.S. PATENT DOCUMENTS

| | | | |
|---|---|---|---|
| 7,396,330 | B2 | 7/2008 | Banet et al. |
| 7,616,110 | B2 | 11/2009 | Crump et al. |

(Continued)

FOREIGN PATENT DOCUMENTS

| | | |
|---|---|---|
| CN | 105342623 A | 5/2018 |
| CN | 106097654 B | 9/2018 |

(Continued)

OTHER PUBLICATIONS

Wei Lu et al. "Smart Triggering of the Barometer in a Fall Detector Using a Semi-Permeable Membrane." IEEE Transactions on Biomedical Engineering vol. 67, No. 1, Jan. 2020, pp. 146-157.

(Continued)

*Primary Examiner* — James J Yang

(74) *Attorney, Agent, or Firm* — Snyder, Clark, Lesch & Chung, LLP

(57) ABSTRACT

A system may include a fall detection pendant configured to be worn by a user. The fall detection pendant includes an accelerometer configured to measure acceleration, a pressure sensor configured to measure barometric pressure and processing logic. The processing logic may be configured to identify a fall event based on data from the accelerometer and the pressure sensor, and determine, based on the fall event, whether a fall has occurred. The system may also include a first repeater device configured to receive information from the fall detection pendant indicating that a fall has occurred, and signal at least one of a second repeater device or a coordinator device that the fall has occurred.

20 Claims, 9 Drawing Sheets

(56) References Cited

U.S. PATENT DOCUMENTS

| | | | |
|---|---|---|---|
| 8,381,603 B2 | 2/2013 | Peng et al. | |
| 8,408,041 B2 | 4/2013 | Ten Kate et al. | |
| 8,487,771 B2 | 7/2013 | Hsieh et al. | |
| 8,618,930 B2 | 12/2013 | Papadopoulos et al. | |
| 8,747,336 B2 | 6/2014 | Tran | |
| 8,773,256 B2 | 7/2014 | Ten Kate et al. | |
| 8,773,269 B2 | 7/2014 | Richardson et al. | |
| 8,823,490 B2 | 9/2014 | Libbus et al. | |
| 8,933,801 B2 | 1/2015 | Sweeney et al. | |
| 9,011,352 B2 | 4/2015 | Ten Kate et al. | |
| 9,111,432 B2 | 8/2015 | Jarman et al. | |
| 9,378,636 B2 | 6/2016 | Vallance et al. | |
| 9,392,966 B2 | 7/2016 | Ten Kate | |
| 9,402,568 B2 | 8/2016 | Barfield | |
| 9,489,815 B2 | 11/2016 | Ten Kate | |
| 9,704,369 B2 | 7/2017 | Richardson et al. | |
| 9,754,470 B2 | 9/2017 | Ten Kate | |
| 9,773,397 B2 | 9/2017 | Ten Kate et al. | |
| 9,805,577 B2 | 10/2017 | Haflinger et al. | |
| 9,876,692 B2 | 1/2018 | Lai | |
| 9,892,612 B2 | 2/2018 | Smits et al. | |
| 9,922,524 B2 | 3/2018 | Devdas et al. | |
| 9,937,090 B2 | 4/2018 | Hayes et al. | |
| 10,304,311 B2 | 5/2019 | Clark et al. | |
| 10,330,494 B2 | 6/2019 | Barfield et al. | |
| 10,433,726 B2 | 10/2019 | Ramesh et al. | |
| 10,448,844 B2 | 10/2019 | Al-Ali et al. | |
| 10,453,202 B2 | 10/2019 | Chronis et al. | |
| 10,580,284 B2 | 3/2020 | Ramaci | |
| 10,670,621 B2 | 6/2020 | Ten Kate | |
| 10,835,186 B2 | 11/2020 | Stone et al. | |
| 11,361,648 B2 | 6/2022 | Ten Kate et al. | |
| 2005/0093709 A1* | 5/2005 | Franco | G16H 40/67 340/686.1 |
| 2011/0025493 A1* | 2/2011 | Papadopoulos | G08B 21/0453 340/539.12 |
| 2012/0259577 A1 | 10/2012 | Ganyi | |
| 2013/0054180 A1 | 2/2013 | Barfield | |
| 2015/0199481 A1 | 7/2015 | Kowal et al. | |
| 2015/0317893 A1 | 11/2015 | Tseng et al. | |
| 2016/0203692 A1 | 7/2016 | Ten Kate et al. | |
| 2017/0055882 A1 | 3/2017 | Al-Ali et al. | |
| 2017/0365148 A1 | 12/2017 | Rosenfeld et al. | |
| 2018/0174420 A1* | 6/2018 | Clark | G08B 25/10 |
| 2019/0059757 A1 | 2/2019 | Balda et al. | |
| 2019/0076063 A1 | 3/2019 | Kent et al. | |
| 2019/0150852 A1 | 5/2019 | Stone et al. | |
| 2019/0167157 A1 | 6/2019 | Espina Perez et al. | |
| 2019/0221315 A1 | 7/2019 | Weffers-Albu | |
| 2019/0287376 A1 | 9/2019 | Netscher et al. | |
| 2020/0289033 A1 | 9/2020 | Sivertsen et al. | |
| 2020/0342730 A1 | 10/2020 | Liu et al. | |
| 2020/0409467 A1 | 12/2020 | Rispens et al. | |
| 2020/0410837 A1* | 12/2020 | Pijl | G08B 21/043 |
| 2020/0411149 A1 | 12/2020 | Chung et al. | |
| 2021/0267491 A1 | 9/2021 | Guibene et al. | |
| 2023/0252881 A1 | 8/2023 | Platt et al. | |
| 2024/0077374 A1 | 3/2024 | Cheng et al. | |

FOREIGN PATENT DOCUMENTS

| | | |
|---|---|---|
| CN | 110047248 A | 7/2019 |
| EP | 2320796 B1 | 8/2017 |
| KR | 20110038274 A | 4/2011 |
| WO | 2016/085405 A1 | 6/2016 |
| WO | 2021130690 A1 | 7/2021 |

OTHER PUBLICATIONS

Co-pending U.S. Appl. No. 18/164,729, filed Feb. 6, 2023, pp. 1-44, and Figs. 1-9.

* cited by examiner

SYSTEMS, DEVICES AND METHODS FOR FALL DETECTION

RELATED APPLICATION

This application claims priority under 35 U.S.C. § 119 based on U.S. Provisional Application No. 63/307,337 filed Feb. 7, 2022, the contents of which are hereby incorporated herein by reference in their entirety.

BACKGROUND INFORMATION

A fall detection pendant is typically worn around the neck of a person and includes one or more sensors to automatically detect a fall. For example, such pendants often include an accelerometer to detect acceleration corresponding to a fall. Fall detection pendants are often worn by residents in senior and assisted living communities and when the pendant detects a fall, the pendant may send an alarm to a central monitoring system to alert personnel that a resident has fallen. However, such pendants often produce false alarms, which can lead to unnecessary work by personnel at the senior/assisted living community responding to the false alarm. For example, personnel may be dispatched to help a resident that actually has not fallen and does not need assistance. In addition, such false alarms often lead to dissatisfaction by the wearers of the pendants, resulting in people having such pendants not wearing them.

DETAILED DESCRIPTION OF PREFERRED EMBODIMENTS

The following detailed description refers to the accompanying drawings. The same reference numbers in different drawings may identify the same or similar elements.

Implementations described herein provide devices, systems and methods for detecting a fall associated with a user wearing a fall detection pendant. In one implementation, a fall detection pendant includes both an acceleration sensor (e.g., an accelerometer) and a pressure sensor (e.g., a barometric pressure sensor) to detect acceleration and changes in barometric pressure for the pendant. In an exemplary implementation, when the measured acceleration and barometric pressure changes meet certain thresholds that correspond to a fall, a fall event associated with a possible fall may be generated. In some implementations, the data associated with a fall event may be filtered in various manners to determine whether a fall has most likely occurred, as opposed to the data being associated with every day occurrences and/or activity of the wearer that may affect the measurements. For example, the fall event data may be filtered with respect to time, with respect to possible typical daily events that may affect the measured pressure and acceleration and/or with respect to components of the acceleration to determine whether a fall has most likely occurred. Filtering the data may reduce the likelihood of false alarms associated with scenarios in which the wearer has not fallen.

Implementations described herein may also transmit data associated with the fall detection pendant to a network for storage (e.g., cloud storage) at a location remote from where the user has fallen. For example, the network storage may be at a location remote from an assisted living or senior living facility where the wearer of the fall detection pendant resides. An emergency call system, which may be located at a senior or assisted living community or elsewhere, may then be able to receive and/or obtain data from the remote storage device/system to track a large number of pendants and dispatch assistance to the wearers of pendants when falls have been detected.

Figure 1:
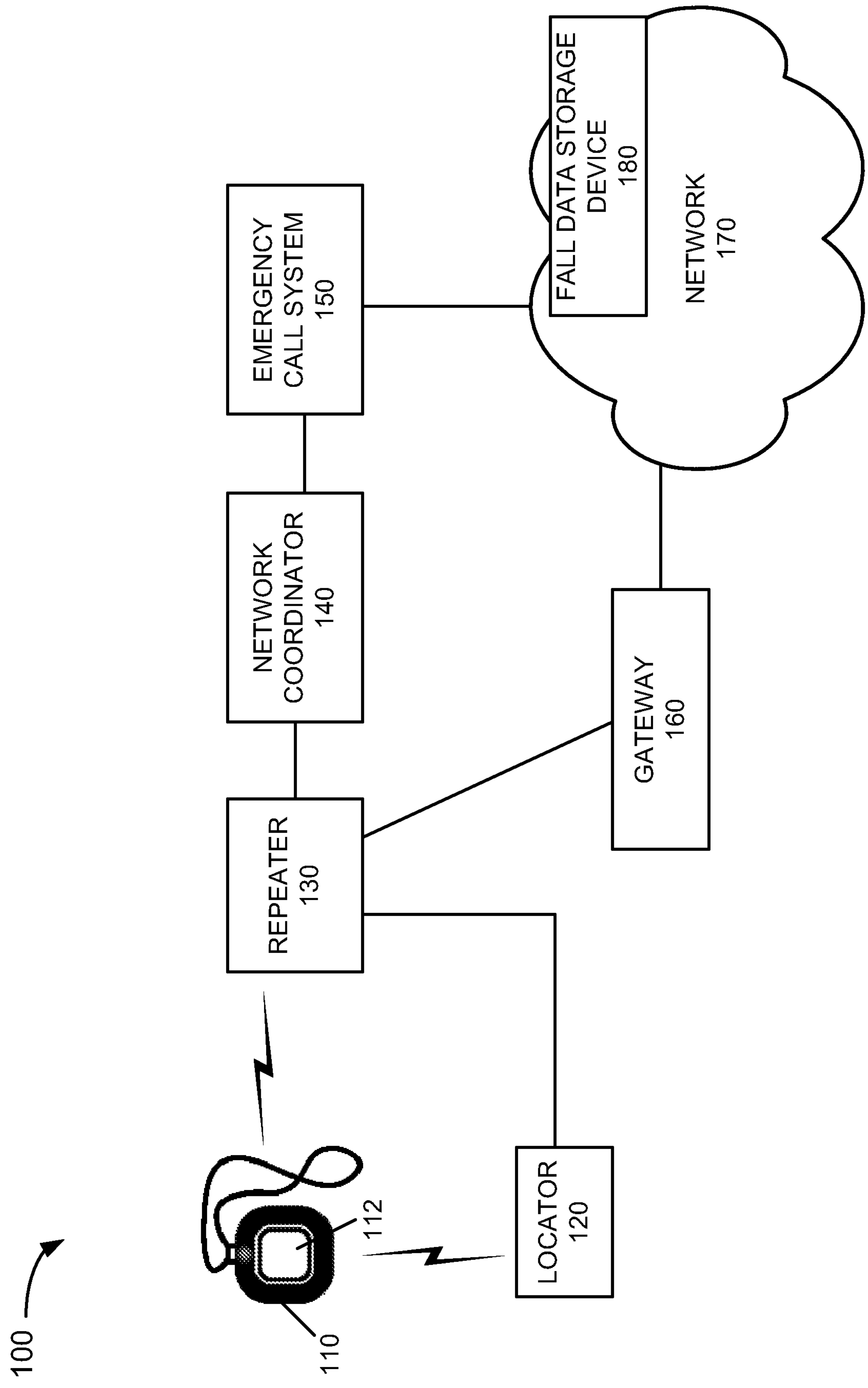
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes fall detection pendant 110 (also referred to herein as pendant 110), locator 120, repeater 130, network coordinator 140, emergency call system 150, gateway 160, network 170 and fall data storage device 180.

Pendant 110 may include a device designed to be worn by a user around the user's neck via a cord, lanyard, necklace or attachment mechanism. In other implementations, pendant 110 may be worn on the wrist of the user or be included in a smart watch worn on the user's wrist, worn around the waist, attached to an article of clothing (e.g., a pocket, a belt, a hat or visor, etc.) or worn/attached to any other body part or article of clothing. In an exemplary implementation, pendant 110 includes one or more sensors (e.g., an accelerometer) to measure acceleration of pendant 110 and one or more pressure sensors (e.g., a barometric pressure sensor) configured to detect the barometric pressure in the area in which pendant 110 is located. Pendant 110 may also include a "call button" 112 located on pendant 110, such as on the front face, rear face or side surface/edge of pendant 110. The call button 112 may be pressed and allow the user to establish communications with or send an alert to a system monitored by personnel, such as emergency call system 150. Pendant 110 may further include hardware and/or software configured to filter data measured by the accelerometer and/or pressure sensor to determine whether the wearer of pendant 110 has fallen based on a combination of the acceleration and barometric pressure, as described in detail below.

Locator 120 may include a device configured to determine a location associated with pendant 110. For example, locator 120 may be mounted at a fixed location, such as in a particular room or hallway in a senior or assisted living community and may be programmed to store its predetermined location in an internal memory. In one implementation, pendant 110 may transmit a beacon signal at predetermined intervals that can be received by any locator 120 located within the wireless transmission range of pendant 110. The wireless signal may be transmitted using, for example, Bluetooth or another wireless protocol, and the wireless signal may include information particularly identifying pendant 110. Locator 120 may receive the signal from pendant 110 and and/or other pendants 110 within the wireless range of locator 120, and transmit information identifying the locations of pendants 110 to repeater 130. In other implementations, locator 120 may signal location information to pendant 110 and pendant 110 may forward the location information to repeater 130. In still other implementations, pendant 110 may include a Global Positioning System (GPS) device configured to determine the location of pendant 110. In such implementations, locator 120 may not be needed. In each case, repeater 130 may receive information identifying the locations of pendants 110 in environment 100, and forward such information to, for example, network coordinator 140. Pendant 110 may also transmit fall related information to repeater 130, as described in detail below.

Repeater 130 may include a device having communication capability and processing logic configured to communicate in a wired and wireless manner. For example, repeater 130 may be coupled to pendant 110, locator 120, network coordinator 140 and gateway 160 via wired or wireless mechanisms. In one implementation, repeater 130 may receive signals from pendant 110, such as signals identifying the particular pendant 110, fall alarm information, etc., that are transmitted wirelessly (e.g., via Bluetooth or another wireless protocol). Repeater 130 may also receive signals from locator 120 identifying the locations of pendants 110 transmitted via a wired or wireless connection. Repeater 130 may forward signals from pendant 110 and locator 120 to network coordinator 140 and gateway 160. In alternative implementations, pendant 110 may forward fall related signals and data to repeater 130 and/or network coordinator 140, as well as forward fall related signals and data to gateway 160.

Network coordinator 140 may include a device associated with a fall detection system in environment 100. For example, network coordinator 140 may be part of a fall monitoring system at a senior or assisted living community. Network coordinator 140 may include communication capability and processing logic to receive signals from a number of repeaters 130 used in a senior/assisted living community. Network coordinator 140 may gather information from the repeaters 130 (only one shown in FIG. 1 for simplicity) and forward signals from the repeaters 130 to emergency call system 150 or another central monitoring system used to monitor pendants 110.

Emergency call system 150 may include one or more computers and/or communication devices that receive messages and/or signals from a number of network coordinators 140 (only one shown in FIG. 1 for simplicity). For example, emergency call system 150 may monitor signals received from a number of network coordinators 140 monitoring hundreds of pendants 110. Such signals may indicate that the wearer of a particular pendant 110 located in a particular room or area has fallen and may need assistance. Emergency call system 150 may dispatch personnel to check on the person that has fallen, as described in more detail below.

Gateway 160 may include a communication device configured to communicate with various devices in environment 100 via wired or wireless connections. For example, gateway 160 may communicate with repeater 130 via a wired connection. Gateway 160 may also be coupled to network 170 via a wired connection or wireless connection (e.g., a cellular connection) to allow information regarding pendant 110 to be stored in a location that is remote with respect to other devices in environment 100, such as pendant 110, repeater 130, network coordinator 140 and emergency call system 150.

Network 170 may include one or more wired, wireless and/or optical networks that are capable of receiving and transmitting data, voice and/or video signals. For example, network 170 may include one or more public switched telephone networks (PSTNs) or other type of switched network. Network 170 may further include one or more satellite networks, one or more packet switched networks, such as an Internet protocol (IP) based network, a software defined network (SDN), a local area network (LAN), a WiFi network, a wide area network (WAN), a Fourth Generation Long Term Evolution (4G LTE) Advanced network, a Fifth Generation (5G) network, an intranet, or another type of network that is capable of transmitting data. In one implementation, network 170 may provide packet-switched services and wireless IP connectivity to various components in environment 100 to transmit fall related data to other devices/systems.

Fall data storage device 180 may include one or more computer devices having communication, processing and storage capabilities and may be located in or accessible via network 170. Fall data storage device 180 may receive fall related data from pendants 110 via gateway 160 and store the fall related data for access by other devices/systems in environment 100. For example, fall data storage 180 may store information regarding the type of alarm received from pendant 110, such as a fall event, a button press event, etc., and information identifying the location of pendant 110, such as a room number, hall/floor number, etc. Fall data storage 180 may also store "smart" fall data received from pendants 110, such as data indicating parameters of the fall, such as acceleration and height changes of pendant 110, an angle or orientation associated with the fall, whether the user has fallen in a forward or backward direction, etc. Fall data storage 180 may also include logic and communication functionality to allow other devices or systems in environment 100 to obtain fall data stored in fall data storage device 180.

For example, fall data storage device 180 may include one or more software programs with an application programming interface(s) (API) to allow users at, for example, emergency call system 150 to obtain detailed fall related data, as described in more detail below. In some implementations, fall data storage device 180 may automatically send smart fall data including information identifying a location for the fall, a type of fall (e.g., severity), a particular acceleration and/or elevation change associated with the fall, a particular angle and/or orientation of the fall, whether the user/wearer of pendant 110 has fallen in a forward direction or a backward direction, whether the user may have fallen from a ladder or other high location based on the elevation change, whether the user has fallen one or more other times within a period of time, particular details associated with the wearer of pendant 110, etc. Such information may allow personnel at emergency call system 150 to dispatch the appropriate personnel to check on the wearer of pendant 110.

The exemplary configuration illustrated in FIG. 1 is provided for simplicity. It should be understood that a typical environment 100 may include more or fewer devices than illustrated in FIG. 1. For example, environment 100 may include a large number (e.g., hundreds or more) of pendants 110, locators 120 and repeaters 130, as well as multiple network coordinators 140, emergency call systems 150, and networks 170. In addition, environment 100 may include multiple fall data storage devices 180 located in different geographical areas that may provide redundancy in situations in which a portion of network 170 may be unavailable. In addition, in some implementations, signals from pendant 110 and/or locator 120 may be transmitted directly to network coordinator 140 without having to be transmitted to repeater 130, depending on, for example, the wireless transmission range of pendant 110 and/or locator 120. Environment 100 may also include other network elements or devices, such as routers, switches, monitoring devices, network elements/functions, etc. (not shown), that aid in routing and transporting data in environment 100.

Various functions are described below as being performed by particular components in environment 100. In other implementations, various functions described as being performed by one device may be performed by another device or multiple other devices, and/or various functions described as being performed by multiple devices may be combined and performed by a single device. For example, in some implementations, the functions of repeater and network coordinator 140 may be combined in a single device.

Figure 2:
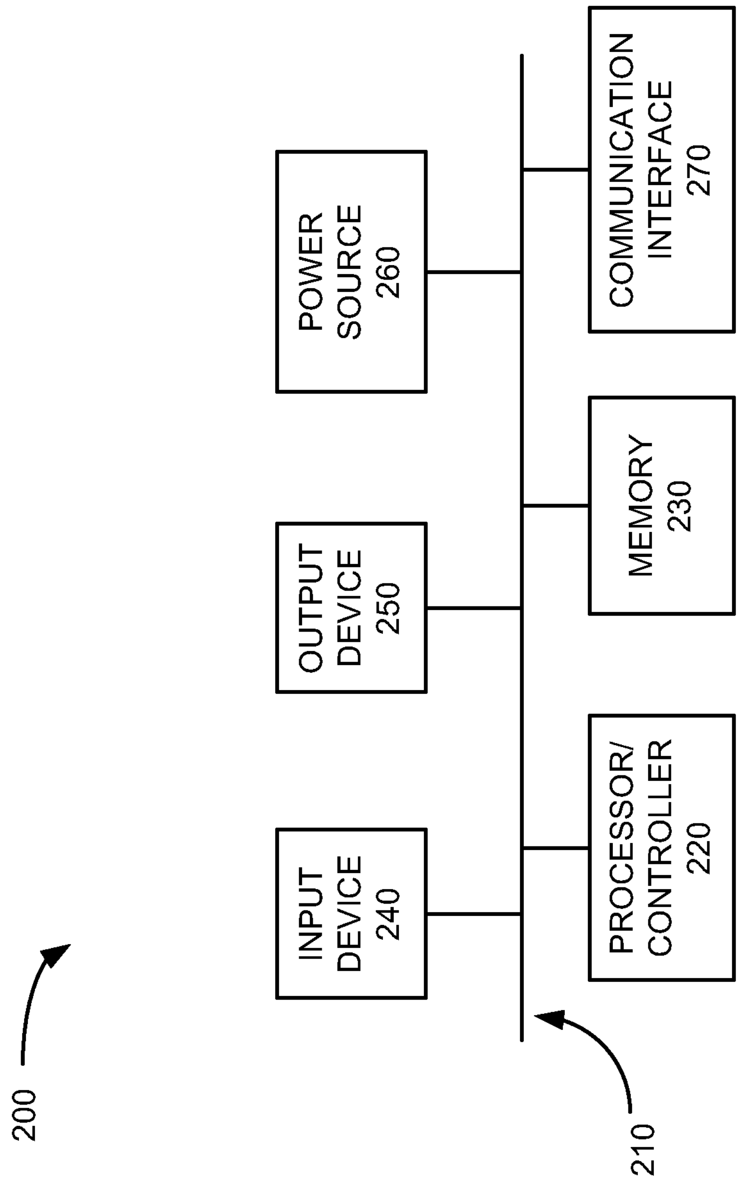
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in pendant 110, locator 120, repeater 130, network coordinator 140, emergency call system 150, gateway 160, fall data storage device 180 and/or other devices included in environment 100. Referring to FIG. 2, device 200 may include bus 210, processor/controller 220, memory 230, input device 240, output device 250, power source 260 and communication interface 270. The exemplary configuration illustrated in FIG. 2 is provided for simplicity. It should be understood that device 200 may include more or fewer components than illustrated in FIG. 2. For example, as described above, in some implementations, pendant 110 may include a GPS device. In such cases, device 200 may include a GPS device to determine the location of device 200.

Bus 210 may include a path that permits communication among the elements of device 200. Processor/controller 220 (also referred to herein as processor 220, controller 220 and/or processing logic 220) may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that stores static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as an input button, a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250. Power source 260 may include a battery or other electrical power source for supplying power to device 200.

Communication interface 270 may include one or more transmitters, receivers and/or transceivers that device 200 uses to communicate with other devices via wired, wireless or optical mechanisms. For example, communication interface 270 may include one or more radio frequency (RF) transmitters, receivers and/or transceivers and one or more antennas for transmitting and receiving RF data. For example, when implemented in pendant 110, communication interface 270 may include one or more RF transmitters, receivers and/or transceivers and one or more antennas for transmitting via a relatively short range RF link and one or more antennas for transmitting and receiving RF data via a longer range connection (e.g., a cellular connection with network 170). Communication interface 270 may also include a modem or an Ethernet interface to a LAN, or other mechanisms for communicating with elements in a network, such as network 170

Communication interface 270 may operate in accordance with one or more communication standards and may include various processing logic and/or circuitry (e.g., multiplexing/de-multiplexing, filtering, amplifying, converting, error correction, etc.)

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 270. Alternatively, hard-wired circuitry may be used in place of or in combination with software instructions to implement processes consistent with the implementations described herein. Thus, implementations described herein are not limited to any specific combination of hardware circuitry and software.

Figure 3:
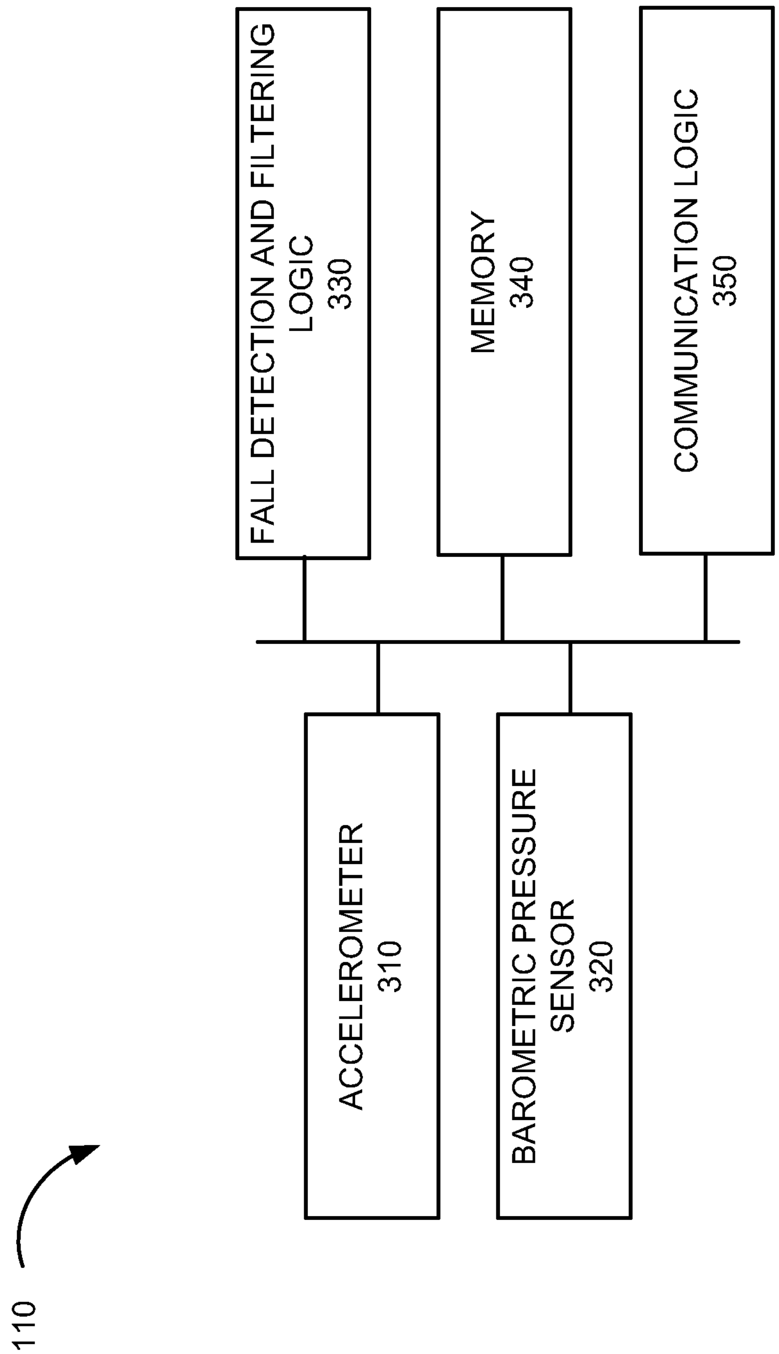
FIG. 3 is a block diagram of components included in the pendant of FIG. 1 in accordance with an exemplary implementation.

FIG. 3 is a block diagram illustrating exemplary components implemented in pendant 110. In an exemplary implementation, some of the components illustrated in FIG. 3 may be implemented by processor 220 executing instructions stored in memory 230.

Referring to FIG. 3, pendant 110 includes accelerometer 310, barometric pressure sensor 320, fall detection and filtering logic 330, memory 340 and communication logic 350. Accelerometer 310 may include one or more sensors to detect the acceleration associated with movement of pendant 110. For example, accelerometer 310 may include a triaxial accelerometer that detects acceleration in the x, y and z directions (e.g., a lateral or sideways corresponding to the x direction, forward or backward corresponding to the y direction and vertical or axial corresponding to the z direction) with respect to x, y and z planes of pendant 110 when pendant 110 moves. Accelerometer 310 may also determine an overall magnitude and direction of the acceleration by combining the accelerations in the x, y and z directions.

Barometric pressure sensor 320 (also referred to herein as pressure sensor 320) may include one or more pressure sensors to detect the barometric pressure associated with environment in which pendant 110 is located. The barometric pressure may correspond to a particular elevation/height above sea level. For example, the barometric pressure at any location may be correlated to an elevation above sea level and the pressure is inversely proportional to the elevation. For example, the greater the pressure, the lower the elevation. Accelerometer 310 and barometric pressure sensor 320 may monitor the acceleration and barometric pressure, respectively, on a continuous or periodic basis, and report the acceleration and barometric pressure readings to fall detection and filtering logic 330 and/or forward the readings for storage in memory 340.

Fall detection and filtering logic 330 may include logic to determine whether the measurements made by accelerometer 310 and pressure sensor 320 correspond to a fall by the wearer of pendant 110. In some implementations, fall detection and filtering logic 330 may filter the acceleration and/or barometric pressure to avoid false alarms with respect to identifying a fall, as described in detail below.

Memory 340 may include a database or storage for storing measurements made by accelerometer 310 and pressure sensor 320. For example, memory 340 may receive measurements made by accelerometer 310 and pressure sensor

320 and store the measurement data, along with time stamps identifying when the measurements were made, for access by fall detection and filtering logic 330.

Communication logic 350 may include logic for communicating with devices in environment 100. For example, communication logic 350 may transmit data to and receive data from locator 120, repeater 130 and other devices in environment 100 via wired, wireless or optical mechanisms.

Although FIG. 3 shows exemplary components of pendant 110, in other implementations, pendant 110 may include fewer components, different components, differently arranged components, or additional components than depicted in FIG. 3. In addition, functions described as being performed by one of the components in FIG. 3 may alternatively be performed by another one or more of the components of pendant 110.

As described above, fall detection pendant 110 may monitor acceleration and barometric pressure to determine whether a fall has occurred. In some implementations, fall detection pendant 110 may filter or monitor the measurement data with respect to time to enhance the accuracy in identifying a fall versus a situation in which the wearer of pendant has not fallen (e.g., a false alarm), as described in detail below.

Figure 4:
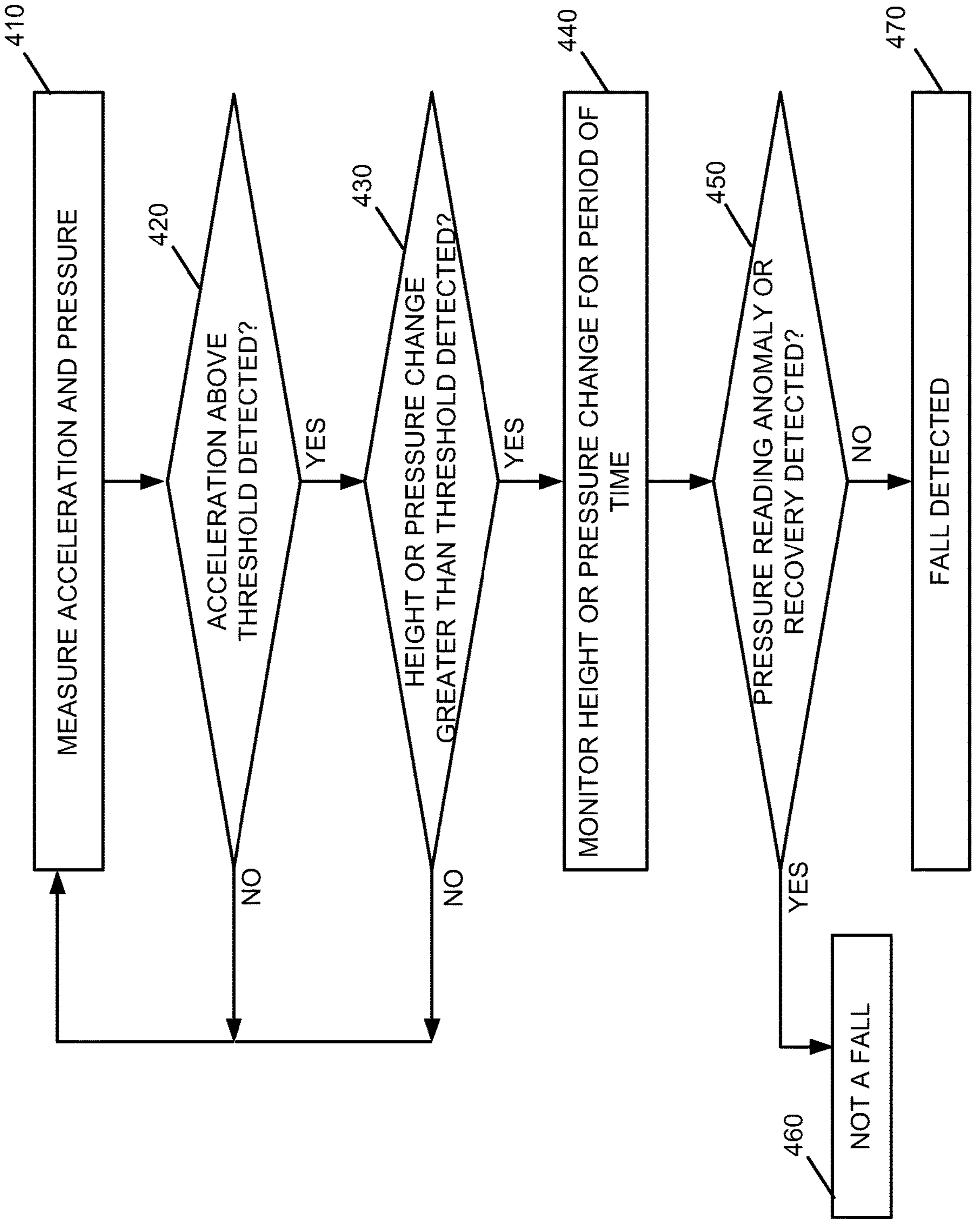
FIG. 4-9 are flow diagrams illustrating processing associated with the environment of FIG. 1 in accordance with exemplary implementations.

FIG. 4 is a flow diagram illustrating processing associated with environment 100 in accordance with an exemplary implementation. Processing may begin with pendant 110 measuring acceleration and barometric pressure (block 410). For example, accelerometer 310 may continuously measure the acceleration associated with movement of pendant 110 and barometric pressure sensor 320 may continuously measure the barometric pressure in the area in which pendant 110 is located.

Accelerometer 310 and pressure sensor 320 may forward these measurements to fall detection and filtering logic 330 and/or forward these measurements for storage in memory 340. Memory 340 may store these measurements in a database along with a time stamp indicating when the measurements were made. As described above, fall detection and filtering logic 330 may monitor both the acceleration and barometric pressure to determine if the combination of acceleration and pressure indicates that a fall or a potential fall (referred to herein as a "fall event") has occurred. In one implementation, fall detection and filtering logic 330 may determine if the acceleration measurement at any particular time is greater than an acceleration threshold value (block 420). For example, the acceleration threshold value may be stored in memory 340 and may correspond to the acceleration known to be associated with the acceleration of pendant 110 when a person wearing pendant 110 has fallen, as opposed to some other movement of the person, such as moving from a standing position to a sitting position or a lying position on the floor, walking or exercising, etc. If fall detection and filtering logic 330 determines that the measured acceleration is not above the acceleration threshold value (block 420—no), processing may return to block 410 and pendant 110 may continue to monitor acceleration and barometric pressure.

If, however, fall detection and filtering logic 330 determines that the measured acceleration is above the threshold (block 420—yes), fall detection and filtering logic 330 may determine whether the height change (also referred to as elevation change) of pendant 110 is greater than a threshold height change at or immediately after the time when the measured acceleration is greater than the threshold acceleration value (block 430). As described previously, the barometric pressure may correspond to a particular elevation above sea level. Fall detection and filtering logic 330 may determine the height of pendant 110 prior to the measured acceleration being above the threshold acceleration value, and determine the height after the measured acceleration change to determine if the height change is greater than a predetermined height change threshold stored in memory 340. For example, the predetermined height change threshold may range from 20 inches to 30 inches (e.g., 22 inches, 26 inches, etc.) or some other particular value. This change in height may correspond to a minimum height change associated with a person having fallen, such as falling from a standing position or a sitting position to a position on the floor or ground after a fall. In some implementations, the height change threshold may be set based on a height of the wearer of pendant 110, whether the wearer uses a wheelchair, etc. In each case, the height change threshold may correspond to a minimum change in height known to correspond to a fall by the person wearing pendant 110.

In other implementations, fall detection and filtering logic 330 may determine if the measured barometric pressure change prior to the measured acceleration change and after the measured acceleration change is greater than a threshold barometric pressure change (block 430). For example, fall detection and filtering logic 330 may not need to convert the pressure change into an elevation change and may compare the measured barometric pressure change to a threshold barometric pressure change stored in memory 340.

In either case, the height change and/or barometric pressure change threshold may be stored in memory 340 and corresponds to a difference in height between the location of pendant 110 at a first instance, such as when the wearer of pendant 110 is standing and a second instance, when the wearer has possibly fallen to the floor. If fall detection and filtering logic 330 determines that the height or barometric pressure change is not above the threshold height/pressure change (block 430—no), processing may return to block 410 and pendant 110 may continue to monitor acceleration and pressure via accelerometer 310 and pressure sensor 320.

If, however, fall detection and filtering logic 330 determines that the height or barometric pressure change is above the corresponding height/barometric change threshold (block 430—yes), fall detection and filtering logic 330 may further measure the barometric pressure over a period of time, such as 20 seconds, 30 seconds, 45 seconds, etc., after the height change above the threshold height change has been detected (block 440). For example, fall detection and filtering logic 330 may use a 30 second window of time to determine whether the height or barometric pressure change at the time of the fall event represents a possible anomaly caused by an external factor, an erroneous pressure reading, or whether the wearer of pendant 110 may have gotten up or recovered from a fall, which result in the height or pressure reading at the end of the 30 second window not being greater than the threshold height or pressure change (block 450).

If fall detection and filtering logic 330 determines that the height change (or pressure change) is not greater than the threshold value at the end of the window of time (block 450—yes), fall detection and filtering logic 330 determines that no fall has occurred (block 460). For example, assume that the height change was determined to be 24 inches at the time of the fall event, but at the end of the window of time, the height change was determined to be 2 inches and the threshold height change value corresponding to a fall is 22 inches. In this case, the height change of 2 inches at the end of the time window is not greater than the threshold height change value of 22 inches, indicating that either the wearer of pendant 110 has gotten up off the floor/ground, or the barometric pressure reading may have been affected by an outside factor or was erroneous.

If, however, the determined height change or barometric pressure change is greater than the threshold value at the end of the window of time after the fall event, fall detection and filtering logic 330 determines that a fall has occurred (block 470). Pendant 110 may then signal repeater 130 that a fall has occurred.

In the manner described above, pendant 110 may apply a predetermined window of time after a fall event to determine whether pressure sensor 320 may have obtained a pressure reading affected by external factors and not from a fall or whether the wearer of pendant 110 has recovered from a fall to a standing or sitting position and is no longer on the floor or ground. For example, it has been found that various every day activities, such as turning on an air conditioning system, opening a window or door, taking a shower in which water hits the face of pendant 110, etc., may cause a pressure spike that is detected/measured by pressure sensor 320. By waiting for a predetermined period of time after a fall event, fall detection pendant 110 may effectively filter out data associated with an environmental pressure spike unrelated to a fall, or a pressure spike caused by an erroneous measurement, as well as allow a wearer to get up from the floor before help is dispatched. This may also provide better accuracy with respect to detecting actual falls, reduce false alarms and improve customer satisfaction with respect to wearing pendant 110, as well as reduce unnecessary work associated with responding to a false fall event.

As described above, filtering height or pressure change information with respect to time may help reduce false alarms. In another exemplary implementation, pressure data may be filtered in another manner, as described in detail below.

Figure 5:
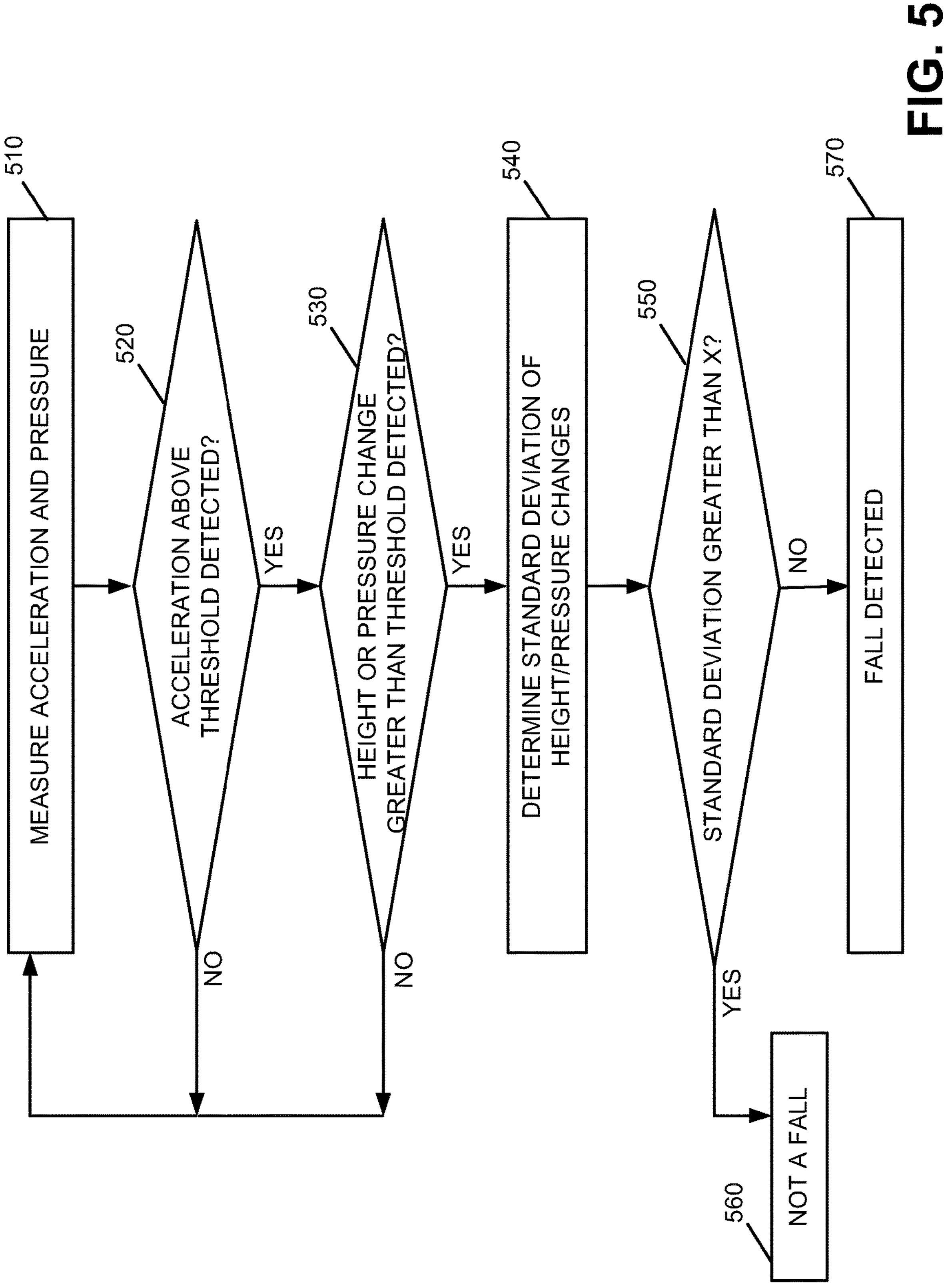

FIG. 5 is a flow diagram illustrating processing associated with environment 100 in accordance with another exemplary implementation. Similar to FIG. 4 above, processing may begin with pendant 110 measuring acceleration and barometric pressure (block 510). For example, accelerometer 310 may continuously measure the acceleration associated with movement of pendant 110 and pressure sensor 320 may continuously measure the barometric pressure in the area in which pendant 110 is located.

Accelerometer 310 and pressure 320 may forward these measurements to fall detection and filtering logic 330 and/or forward these measurements for storage in memory 340. Memory 340 may store these measurements in a database along with a time stamp indicating when the measurements were made. As described above, fall detection and filtering logic 330 may monitor both the acceleration and barometric pressure to determine if the combination of acceleration and pressure indicates that a fall or a potential fall (e.g., a fall event) has occurred. In one implementation, fall detection and filtering logic 330 may determine if the acceleration measurement at any particular time is greater than an acceleration threshold value (block 520). For example, as described previously, the acceleration threshold value may be stored in memory 340 and may correspond to the acceleration known to be associated with the acceleration of pendant 110 when a person wearing pendant 110 has fallen, as opposed to some other movement of the person, such as the person moving from a standing position to sitting or lying down, the person is walking or exercising, etc. If fall detection and filtering logic 330 determines that the measured acceleration is not above the acceleration threshold value (block 520—no), processing may return to block 510 and pendant 110 may continue to monitor acceleration and barometric pressure.

If, however, fall detection and filtering logic 330 determines that the measured acceleration is above the threshold (block 520—yes), fall detection and filtering logic 330 may determine whether the height change of pendant 110 is greater than a threshold height change at or immediately after the time when the measured acceleration is greater than the threshold acceleration value (block 530). Fall detection and filtering logic 330 may determine the height of pendant 110 prior to the measured acceleration being above the threshold acceleration value, and determine the height after the measured acceleration change to determine if the height change is greater than a predetermined height change threshold stored in memory 340. For example, the predetermined height change threshold may range from 20 inches to 30 inches (e.g., 22 inches, 26 inches, etc.) or some other particular value. As described previously, this change in height may correspond to a minimum height change associated with a person having gone from a standing position or a sitting position, to a position on the floor or ground after a fall. As also described above, in some implementations, the height change threshold may be set based on a height of the wearer of pendant 110, whether the wearer uses a wheelchair, etc. In each case, the height change threshold may correspond to a minimum change in height known to correspond to a fall by the person wearing pendant 110.

In other implementations, fall detection and filtering logic 330 may determine if the measured barometric pressure change prior to the measured acceleration change and after the measured acceleration change is greater than a threshold barometric pressure change (block 530). For example, as described previously, fall detection and filtering logic 330 may not need to convert the pressure change into an elevation change and may compare the measured barometric pressure change to a threshold barometric pressure change stored in memory 340.

In either case, the height change and/or barometric pressure change threshold may be stored in memory 340 and corresponds to a difference in height between the location of pendant 110 at a first instance, such as when the wearer of pendant 110 is standing or sitting and a second instance, when the wearer has most likely fallen to the floor. If fall detection and filtering logic 330 determines that the height or barometric pressure change is not above the threshold height/pressure change (block 530—no), processing may return to block 510 and pendant 110 may continue to monitor acceleration and pressure via accelerometer 310 and pressure sensor 320.

If, however, fall detection and filtering logic 330 determines that the height or barometric pressure change is above the corresponding height/barometric change threshold (block 530—yes), fall detection and filtering logic 330 may further determine the standard deviation of the measured height changes (or barometric pressure changes) of pendant 110 based on measurements stored in memory 340 (block 540).

Fall detection and filtering logic 330 may then compare the standard deviation of the height (or barometric pressure change) to a predetermined threshold value. The predetermined threshold value may be associated with relative pressure or height thresholds used for the determination of a fall.

If the determined standard deviation of the height change (or pressure change) is greater than the predetermined threshold value of the height change (or pressure change)

(block 550—yes), fall detection and filtering logic 330 determines that no fall has occurred (block 560). For example, assume that the standard deviation of the height change is 8.5 inches and the threshold value is 6 inches. In this case, the standard deviation of 8.5 inches is greater than the threshold value of 6 inches and therefore, fall detection and filtering logic 330 determines that no fall occurred.

If, however, the determined standard deviation of the height change or barometric pressure change is not greater than the predetermined threshold (block 550—no), fall detection and filtering logic 330 determines that a fall has occurred (block 570). Pendant 110 may then signal repeater 130 that a fall has occurred.

In the description above, a standard deviation of the height change or barometric pressure has been used to filter the barometric pressure readings to determine whether a fall occurred. In other implementations, a mean or average height/barometric pressure may be used instead of a standard deviation to determine whether a fall has occurred.

In the manner described above, pendant 110 may filter data for a fall event to determine whether a fall has most likely occurred. For example, determining the standard deviation of the height or barometric change and comparing the height/barometric pressure change to a threshold value for the standard deviation may effectively filter out data associated with an environmental pressure spike and provide better accuracy with respect to detecting actual falls. This may also reduce false alarms and improve customer satisfaction with respect to wearing pendant 110, as well as reduce unnecessary work associated with responding to false alarms.

As described above, reducing the prevalence of false alarms with respect to falls may improve satisfaction for wearers of pendants 110, as well as reduce labor associated with personnel checking on users with respect to possible falls. In another implementation, the acceleration data may be filtered to prevent false fall indications. For example, pendant 110 may filter fall event data based on effectively identifying directional components of the acceleration and/or an angle of the acceleration of pendant 110, as described in detail below.

Figure 6:
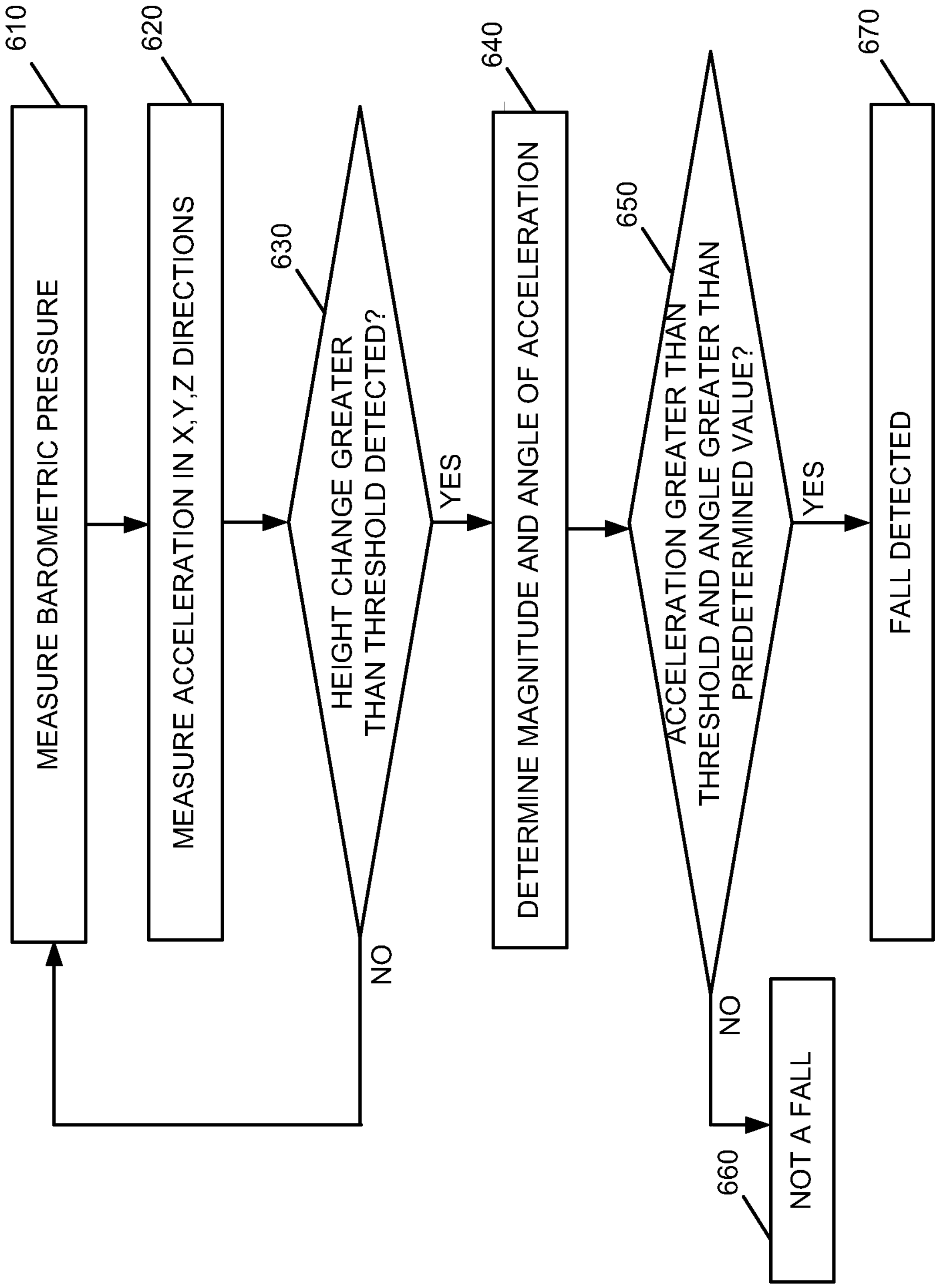

FIG. 6 is a flow diagram illustrating processing associated with filtering acceleration data in environment 100 in accordance with another exemplary implementation. Referring to FIG. 6, processing may begin in a similar manner as described above with respect to FIGS. 4 and 5 with pendant 110 measuring barometric pressure (block 610). For example, as described above, pressure sensor 320 may continuously measure the barometric pressure in the area in which pendant 110 is located. Accelerometer 310 may also continuously measure the acceleration associated with movement of pendant 110 in the x, y and z directions with respect to x, y and z planes of pendant 110, which may correspond to x, y and z planes of the wearer of pendant 110 (block 620). For example, as described above, accelerometer 310 may be a triaxial accelerometer capable of measuring acceleration in the x, y and z directions with respect to pendant 110, with the x direction representing a lateral or sideways motion of pendant 110 with respect to the wearer (e.g., transverse to the main plane of the user's body), the y direction being perpendicular to the x plane representing forward or backward motion with respect to the wearer of pendant 110, and the z-plane representing motion of the pendant in the vertical or axial direction with respect to pendant 110 (and the wearer's body).

Accelerometer 310 and pressure sensor 320 may forward these measurements to fall detection and filtering logic 330 and/or forward these measurements to memory 340 for storage. Memory 340 may store these measurements in a database along with a time stamp indicating when the measurements were made. In either case, fall detection and filtering logic 330 may receive the readings and/or access the readings from memory 340 and determine whether the height change or barometric pressure change associated with successive measurements is greater than a threshold height or pressure change (block 630). The threshold height or pressure change may be stored in memory 340. As described above, the barometric pressure change may correspond to an elevation above sea level and fall detection and filtering logic 330 may use the difference between successive barometric pressure readings to calculate the height change of pendant 110 from the location of pendant 110 at a first instance at which a barometric pressure measurement has been made and a second instance at which a second barometric pressure measurement has been made. If fall detection and filtering logic 330 determines that the height change or barometric pressure change is not above the corresponding height change/barometric change threshold (block 630—no), processing may return to block 610 and pendant 110 may continue to monitor pressure and acceleration.

If, however, fall detection and filtering logic 330 determines that the calculated height change (or barometric pressure change) is above the threshold (block 630—yes), fall detection and filtering logic 330 may determine the magnitude of the acceleration and an overall angle of the acceleration (block 640). For example, as discussed above, accelerometer 310 may be a triaxial accelerometer capable of measuring acceleration in each of the x, y and z directions. Fall detection and filtering logic 310 may use the x, y and z components of the acceleration to determine an overall magnitude of the acceleration and an overall angle associated with the acceleration.

For example, when a person falls, as opposed to the wearer of pendant 110 merely sitting down, the wearer of pendant's 110 body may move sideways, backwards, rotate at an angle, etc. That is, when a person falls to the floor, the body typically rotates to some extent, as opposed to falling straight down. Therefore, generating an angle associated with the acceleration may allow fall detection and filtering logic 330 to distinguish between a wearer of pendant 110 falling as opposed to the wearer of pendant 110 simply sitting down.

Fall detection and filtering logic 330 may then determine if the overall magnitude of the acceleration is greater than the threshold acceleration value stored in memory 340 and whether the angle associated with the acceleration is greater than a threshold angle stored in memory 340 (block 650).

If either the overall acceleration magnitude is not greater than the acceleration threshold or the angle associated with the acceleration is not greater than the threshold angle (block 650—no), fall detection and filtering logic 330 may determine that a fall has not occurred (block 660). If, however, the determined acceleration in greater than acceleration threshold and the angle associated with the acceleration is greater than the threshold angle, fall detection and filtering logic 330 determines that a fall has occurred (block 670). Pendant 110 may then signal repeater 130 that a fall has occurred.

As described above, an overall acceleration magnitude and overall angle may be determined for a fall event and used to determine if a fall has likely occurred. In other implementations, fall detection and filtering logic 330 may use the accelerations measured in each of the x, y and/or z direction and determine whether each of the acceleration components is greater than corresponding thresholds for the accelerations in the x, y and z directions. For example if the acceleration values in each of the x, y and z direction is not greater than a corresponding x, y and z acceleration threshold, no fall has occurred. In contrast, if the acceleration values in each of the x, y and z directions is greater than corresponding thresholds, fall detection and filtering logic 330 determines that a fall has occurred.

In either case, by capturing acceleration values in the x, y and z directions and/or determining an angle associated with the acceleration, fall detection and filtering logic 330 may filter out acceleration data associated with the wearer of pendant having sat down as opposed to the wearer of pendant 110 having fallen.

In this manner, pendant 110 may filter out data in which an actual fall has not occurred, such as data associated with the wearer of pendant 110, for example, sitting down, to provide better accuracy with respect to detecting actual falls. This may further help reduce false alarms and improve customer satisfaction, as well as reduce unnecessary work associated with responding to a false fall event.

As described above, the acceleration data in the x, y and z directions may be measured and filtered to prevent false fall indications. In other implementations, the acceleration data may be filtered in other manners to reduce false alarms, as described in detail below.

Figure 7:
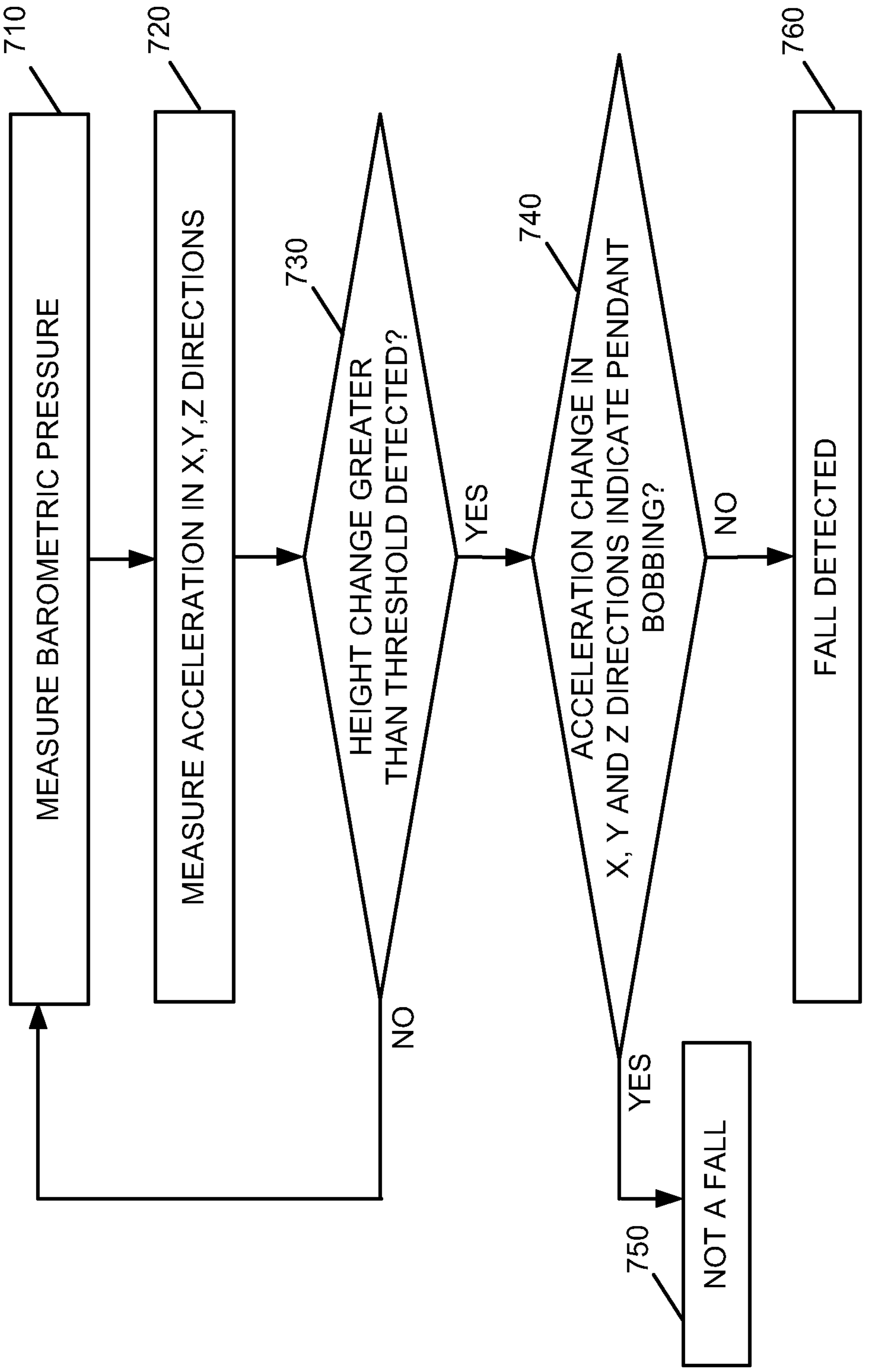

FIG. 7 is a flow diagram illustrating processing associated with filtering acceleration data in environment 100 in accordance with another exemplary implementation. Referring to FIG. 7, processing may begin with pendant 110 measuring barometric pressure (block 710). For example, as described above, pressure sensor 320 may continuously measure the barometric pressure in the area in which pendant 110 is located. Accelerometer 310 may also continuously measure the acceleration associated with movement of pendant 110 in the x, y and z directions (block 720). For example, as described above, accelerometer 310 may be a triaxial accelerometer capable of measuring acceleration in the x, y and z directions with respect to pendant 110, with the x direction representing a sideways motion of pendant 110 with respect to the wearer (e.g., transverse to the main plane of the user's body), the y direction being perpendicular to the x plane representing forward or backward motion with respect to the wearer of pendant 110, and the z-plane representing motion of the pendant in the vertical or axial direction with respect to the user's body.

Accelerometer 310 and pressure sensor 320 may forward these measurements to fall detection and filtering logic 330 and/or forward these measurements to memory 340 for storage. Memory 340 may store these measurements in a database along with a time stamp indicating when the measurements were made. Fall detection and filtering logic 330 may receive the readings and/or access the readings from memory 350 and determine if the height change or barometric pressure change associated with successive measurements is greater than a threshold height or pressure change (block 730). As described above, the barometric pressure change may correspond to an elevation above sea level and the difference between successive barometric pressure readings may correspond to a difference in height of pendant 110 from the location of pendant 110 at a first instance at which a barometric pressure measurement has been made and a second instance at which a second barometric pressure measurement has been made. The threshold height or pressure change may be stored in memory 350. If fall detection and filtering logic 330 determines that the height change or barometric pressure change is not above the corresponding height change/barometric change threshold (block 730—no), processing may return to block 710 and pendant 110 may continue to monitor acceleration and pressure.

If, however, fall detection and filtering logic 330 determines that the calculated height change (or barometric pressure change) is above the threshold (block 730—yes), fall detection and filtering logic 330 may determine if the acceleration measured by accelerometer 310 in the x, y and/or z direction indicates that pendant 110 is moving in a back and forth periodic manner, such as bobbing or swinging back and forth (block 740). Such a bobbing motion may occur when the wearer of pendant 110 is walking at a relatively fast pace. Fall detection and filtering logic 330 may identify such a scenario based on acceleration in the x and y directions being relatively high, while acceleration in the z direction is relatively low. Pendant 110 may store other characteristic x, y and z accelerations associated with the wearer of pendant 110 performing normal activities that are not associated with a fall.

If the acceleration in the x, y and z directions matches an acceleration patterns stored in memory 340 that are known to be associated with every day activities and not a fall (block 740—yes), fall detection and filtering logic 330 may determine that a fall has not occurred (block 750). For example, if the measured acceleration values in the x and y directions are greater than the threshold acceleration values in the x and y directions, but the measured acceleration in the z direction is less than the z acceleration threshold, which may correspond to pendant 110 moving back and forth or bobbing/swaying as the wearer of pendant 110 is walking or exercising. In such a case, fall detection and filtering logic 330 may determine that a fall has not occurred.

If, however, the determined acceleration pattern does not match any acceleration pattern associated with every day activities that is stored in memory 340 (block 740—no), detection and filtering logic 330 determines that a fall has occurred (block 760). For example, if the measured acceleration in each of the x, y and z directions is greater than the acceleration thresholds for the x, y and z directions, respectively, fall detection and filtering logic 330 determines that a fall has occurred (block 760). Pendant 110 may then signal repeater 130 that a fall has occurred.

In the description above, pendant 110 was described as storing characteristic x, y and z accelerations associated with pendant 110 bobbing or moving back and forth. In other implementations, pendant 110 may store other characteristic x, y and z accelerations associated with the wearer of pendant 110 performing normal activities that are not associated with a fall. In each case, fall detection and filtering logic 330 may compare the measured x, y and z acceleration values to filter out scenarios associated with normal movement of pendant 110, as opposed to movement patterns associated with an actual fall.

In this manner, pendant 110 may filter out data in which an actual fall has not occurred, such as data associated with pendant 110 moving during the normal course of a wearer's activities. Further, in some implementations, fall detection and filtering logic 330 may use a machine learning algorithm to learn patterns associated with a wearer's normal activities over time to further filter out acceleration patterns and/or pressure change patterns not associated with a fall. As one example, fall detection and filtering logic 330 may determine a pattern associated with measured pressure changes that may be associated with a wearer tapping on the side of pendant 110. Such tapping may cause an increase in pressure that may be measured by pressure sensor 320. Fall detection and filtering logic 330, using a machine learning algorithm, may be able to filter out such pressure changes as being unrelated to a fall. This may further help reduce false alarms and improve customer satisfaction, as well as reduce unnecessary work associated with responding to a false fall event.

As described above, the combination of barometric pressure and acceleration data may be used to identify when a wearer of pendant 110 has fallen. In some implementations, barometric pressure sensor 320 is very sensitive and may be able to detect very small pressure differences. However, in some implementations, due to its high sensitivity, barometric pressure sensor 320 may be susceptible to environmental pressure changes that are unrelated to the height of pendant 110. Such sensitivity may lead to false alarms. In another exemplary implementation, pendant 110 may examine acceleration data before and after a fall event to determine whether a fall has actually occurred, as described in detail below.

Figure 8:
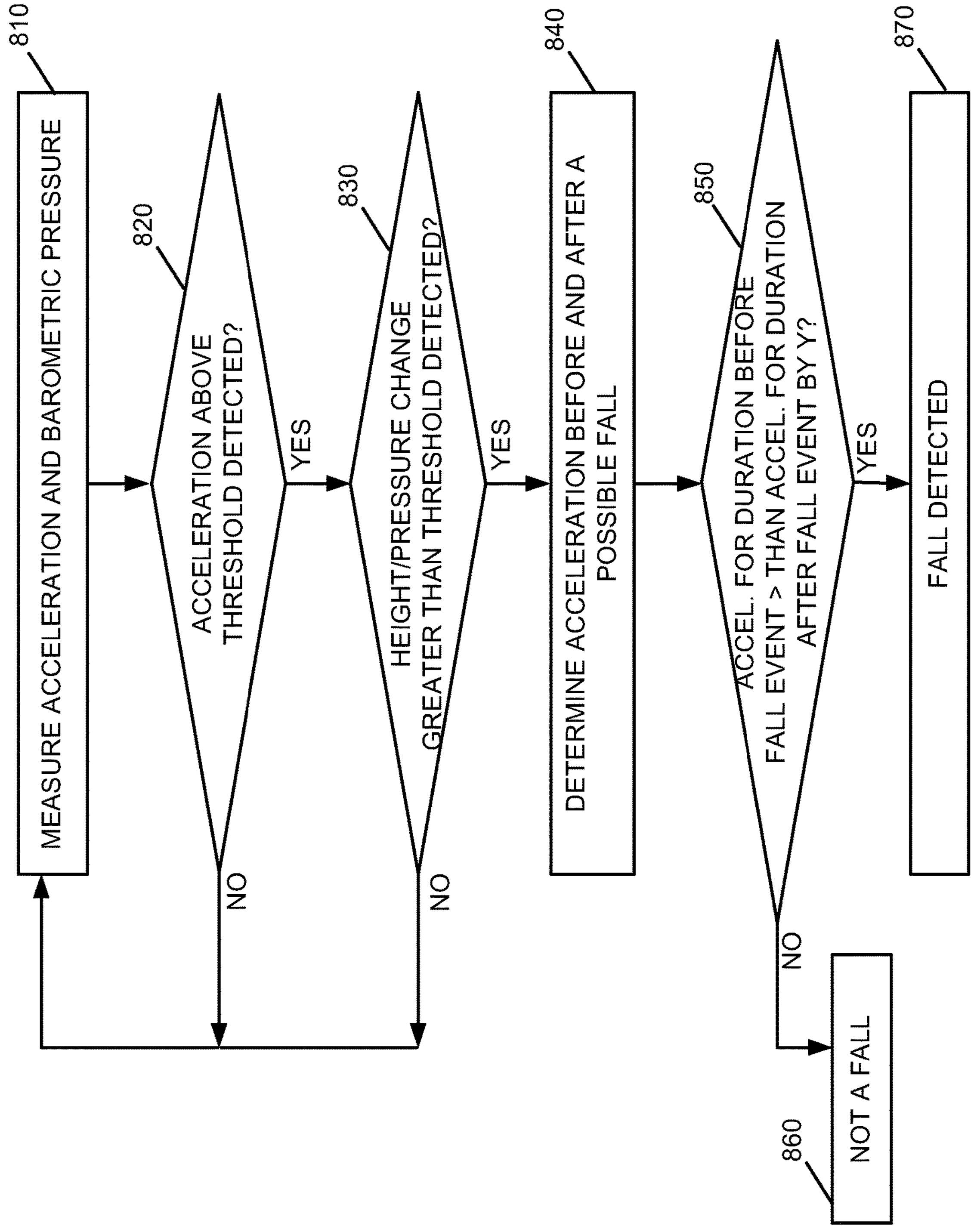

FIG. 8 is a flow diagram illustrating processing associated with determining whether a fall has occurred in environment 100 in accordance with another exemplary implementation. Referring to FIG. 8, processing may begin with pendant 110 measuring barometric pressure (block 810). For example, as described above, barometric pressure sensor 320 may continuously measure the barometric pressure in the area in which pendant 110 is located. Accelerometer 310 may also continuously measure the acceleration associated with movement of pendant 110 in the x, y and z directions.

Accelerometer 310 and pressure sensor 320 may forward these measurements to fall detection and filtering logic 330 and/or forward these measurements to memory 340 for storage. Memory 340 may store these measurements in a database along with a time stamp indicating when the measurements were made. In either case, fall detection and filtering logic 330 may receive the readings and/or access the readings from memory 340 and determine if the height change or barometric pressure change associated with successive measurements is greater than a threshold height or pressure change (block 830). As described above, the difference between successive barometric pressure readings may correspond to a difference in height of pendant 110 from the location of pendant 110 at a first instance at which a first barometric pressure measurement has been made and a second instance at which a second barometric pressure measurement may be made. The threshold height or pressure change may be stored in memory 340. If fall detection and filtering logic 330 determines that the height change or barometric pressure change is not above the corresponding height change/barometric change threshold (block 830—no), processing may return to block 810 and pendant 110 may continue to monitor acceleration and pressure.

If, however, fall detection and filtering logic 330 determines that the calculated height change (or barometric pressure change) is above the threshold (block 830—yes), fall detection and filtering logic 330 may obtain measurements of the acceleration before and after the fall event (block 840). For example, fall detection and filtering logic 330 may obtain the acceleration for a predetermined number of seconds, such as two seconds, five seconds, etc., before the fall event and obtain the acceleration data for the same predetermined number of seconds after the fall event. Fall detection and filtering logic 330 may then count the number of seconds that the acceleration data is above the threshold before the fall event and count the number of seconds that the acceleration data is above the threshold after the fall event.

Fall detection and filtering logic 330 may then compare the count (e.g., number of seconds) before the fall event with the count after the fall event. Fall detection and filtering logic 330 may then determine whether the count before the fall event is higher than the count after the fall event by a threshold value, which may be stored in memory 340 (block 850).

If the acceleration count before the fall event is not greater than the acceleration count after the fall event by the threshold value (block 850—no), fall detection and filtering logic 330 determines that no fall has occurred (block 860). If, however, the acceleration count before the fall event is greater than the acceleration count after the fall event by the threshold value (block 850—yes), fall detection and filtering logic 330 determines that a fall has occurred (block 870). Pendant 110 may then signal repeater 130 that a fall has occurred.

In this manner, pendant 110 may filter out data in which an actual fall has not occurred, such as data associated with an environmental pressure change that occurs at the same time as movement of pendant 110 that are both unrelated to a user having actually fallen. This may further help reduce false alarms and improve customer satisfaction.

As described above, the combination of barometric pressure and acceleration data may be used to identify when a wearer of pendant 110 has fallen. In some implementations, pendant 110 may include call button 112 located on the front of pendant 110 to allow a wearer to request assistance for an issue which may be unrelated to a fall. However, due to the sensitivity of pressure sensor 320, pressing the call button 112 may cause other issues that may require pendant to filter data associated with the pressing of call button 112, as described in detail below.

Figure 9:
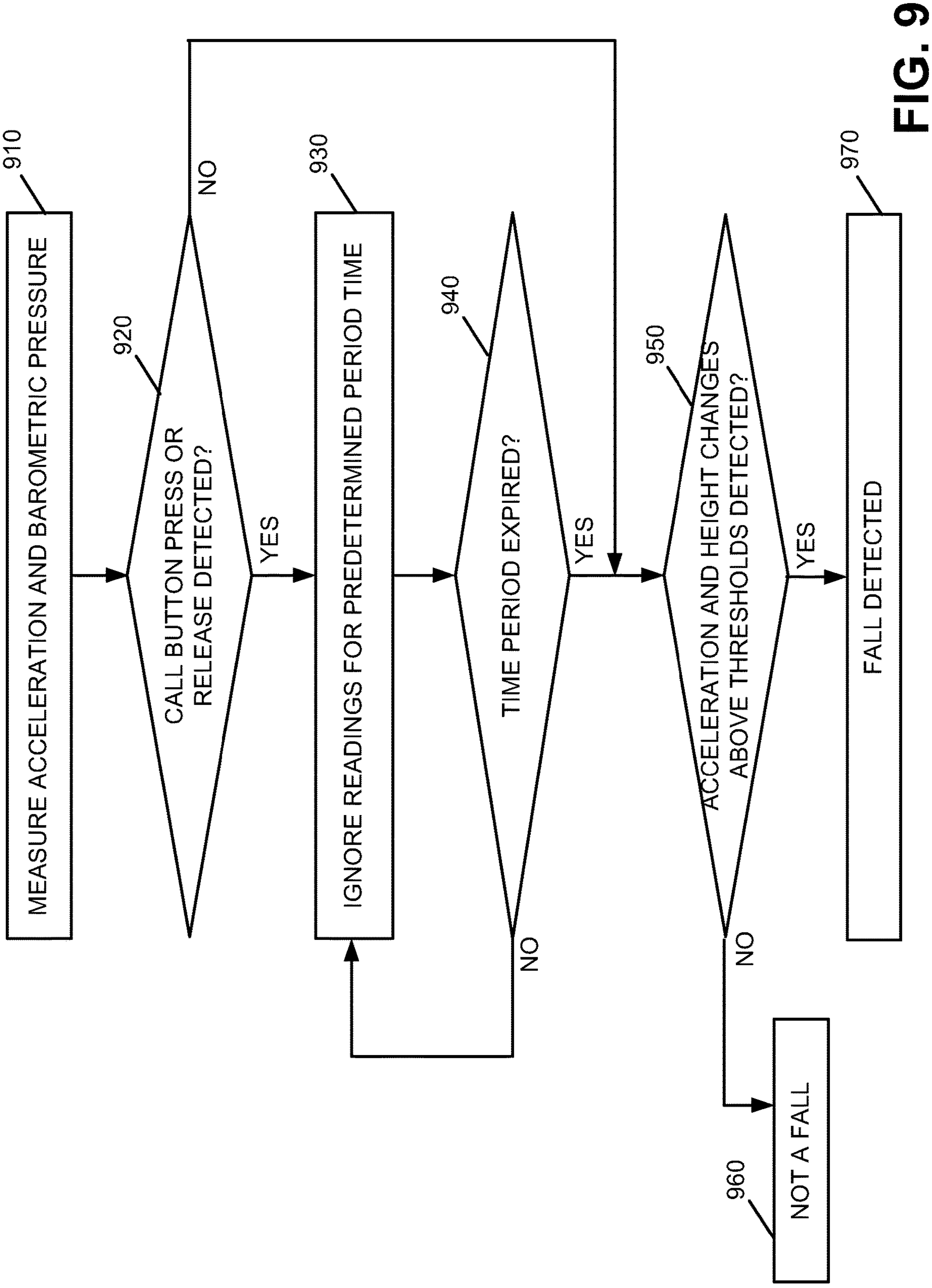

FIG. 9 is a flow diagram illustrating processing associated with determining whether a fall has occurred in environment 100 in accordance with another exemplary implementation. Referring to FIG. 9, processing may begin with pendant 110 measuring acceleration and barometric pressure (block 910). For example, as described above, accelerometer 310 may continuously monitor acceleration of pendant 110 and pressure sensor 320 may continuously measure the barometric pressure in the area in which pendant 110 is located. Fall detection and filtering logic 330 may determine if an input or change of input associated with the call button 112 is detected (e.g., a person presses call button 112 or a person has released the pressing of call button 112) (block 920). If a button press or release of call button 112 is not detected (block 920—no), processing may proceed to block 950 described below.

If, however, fall detection and filtering logic 330 detects that call button 112 has been pressed or released (block 920—yes), fall detection and filtering logic may ignore barometric pressure readings from pressure sensor 320 for a predetermined period of time (block 930). For example, due to sensitivity of pressure sensor 320, it has been found that the physical pressing of call button 112 may cause air movement that results in a spike in the pressure measured by pressure sensor 320. Similarly, a release of pressure on call button 112 may also cause a change in pressure measure by pressure sensor 320. To avoid a spike or other change in pressure not caused by an actual fall, fall detection and filtering logic 330 may ignore or not process pressure readings from pressure sensor 320 for a predetermined period of time (e.g., two seconds, five seconds or some other period of time) after call button 112 is pressed or released. Fall detection and filtering logic 330 may determine if the predetermined period of time has expired (block 940). If the predetermined period of time has not expired (block 940—no), processing may return to block 930.

If, however, the predetermined period of time has expired (block 940—yes), fall detection and filtering logic 330 may determine whether the acceleration change and height change are above the respective acceleration and height changes stored in memory 340 (block 950).

If fall detection and filtering logic 330 determines that the height change or barometric pressure change is not above the corresponding height change/barometric change threshold (block 950—no), fall detection and filtering logic 330 determines that no fall has occurred (block 960). If, however, the acceleration and height change thresholds are both greater than the acceleration and height change thresholds (block 950—yes), fall detection and filtering logic 330 determines that a fall has occurred (block 970). Pendant 110 may then signal repeater 130 that a fall has occurred.

In this manner, pendant 110 may filter out data in which an actual fall has not occurred, such as data associated with a pressure spike caused by the pressing of call button 112. This may further help reduce false alarms and improve customer satisfaction.

In some instances, as a wearer of pendant 110 walks, sits down, gets up, exercises, etc., pendant 110 may move back and forth. Such movement may result in pendant 110 contacting a hard surface, such as a button on the wearer's clothing or some other device having a hard surface, such as jewelry on the wearer's clothes. In other instances, a wearer of pendant 110 may tap on the sides or front of pendant 110 while fidgeting with pendant 110. As a result of such contact, pressure sensor 320 may experience a brief variation or spike in pressure caused by a membrane of pendant 110 being pushed inwardly. In accordance with an exemplary implementation, to avoid such pressure variations not associated with a fall, fall detection and filtering logic 330 may filter a number of samples of pressure readings over a period of time and use a median value of the pressure reading to determine whether a fall may have occurred.

For example, pressure sensor 320 may make four pressure readings every second. In one implementation, fall detection and filtering logic 330 may calculate the median value of the four pressure readings and use the median value to determine whether the barometric pressure value or height value corresponding to the median pressure value has changed by a threshold amount. In this manner, pendant 110 may filter out pressure values that are the result of contact with a hard surface (e.g., a button) or the result of tapping on the side/front of pendant 110 by the wearer. That is, fall detection and filtering logic 330 may use the median pressure value to determine whether the pressure value or height value has changed by more than a threshold amount, as described above in the processing associated with FIGS. 4-9. Using the median value for pressure/height readings may help filter out extreme values not caused by a fall and may further help reduce falls alarms with respect to possible falls.

As described above, fall detection pendant 110 may be worn around a user's neck or worn on a wrist of the user. As also described above, pendant 110 may include a battery to power pendant 110. In an exemplary implementation, pendant 110 may operate in a "sleep" mode in which not all elements of pendant 110 are powered. For example, accelerometer 310 and pressure sensor 320 may be continuously powered and fall detection and filtering logic 330 may continuously monitor the measured values. However, other elements of pendant 110 may not be powered up until a pressure change and/or acceleration change are detected. This may help conserve battery power of pendant 110.

Implementations described herein filter data from accelerometer 310 and barometric pressure sensor 320 with respect to time and/or with respect to particular issues that may cause "false" readings that are not associated with an actual fall. This may reduce fall alarms for wearers of pendants 110. Implementations described here may also transmit detailed fall related data (e.g., smart fall data) to a cloud storage system which may then automatically send alerts to an appropriate fall detection monitoring system. The smart fall data may allow a party at the fall detection and monitoring system to identify particular details of the fall, including an acceleration, an acceleration angle, a height change, information indicating that the wearer may have fallen down a flight of steps or fallen from a ladder based on, for example, the height change, a location, and other information which may enhance the response to the wearer of pendant 110.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to performing various "filtering" of data described above with respect to FIGS. 4-9 to avoid false alarms with respect to falls. In some implementations, features described with respect to all or some of the processing described with respect to FIGS. 4-9 may be combined in a single implementation. For example, features associated with waiting for a predetermined time after a fall event described with respect to FIG. 4 may be combined with measuring acceleration and/or a standard deviation of height or pressure readings described in FIG. 5, and such a combination may be further combined with determining an acceleration angle or characteristics of acceleration described with respect to FIGS. 6 and/or 7, as well as combined with features described with respect to FIGS. 8 and 9 to further enhance the accuracy with respect to detecting falls.

It should also be understood that the particular time durations and/or height changes, acceleration values or angles described above are exemplary only and other values may be used. Further, while series of acts have been described with respect to FIGS. 4-9, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
a fall detection pendant configured to be worn by a user, wherein the fall detection pendant comprises:
an accelerometer configured to measure acceleration,
a pressure sensor configured to measure barometric pressure, and
processing logic configured to:
identify a fall event based on data from the accelerometer and the pressure sensor, and
determine, based on the fall event, whether a fall has occurred;
a first repeater device configured to:
receive information from the fall detection pendant indicating that a fall has occurred, and
signal at least one of a second repeater device or a coordinator device that the fall has occurred; and
a plurality of locator devices, wherein each of the plurality of locator devices is associated with a particular location, and a first one of the plurality of locator devices is configured to:
receive, from the fall detection pendant and via a wireless medium, a signal that includes an identifier associated with the fall detection pendant, and
transmit, to the first repeater device, information indicating a location of the fall detection pendant based on the particular location associated with the first locator device,
wherein the processing logic is further configured to:
examine, at a first time after expiration of a predetermined time period after the fall event, a measurement from the pressure sensor, and
determine based on the measurement from the pressure sensor at the first time whether the fall event represents an erroneous pressure reading.

2. The system of claim 1, further comprising:
a gateway device,
wherein the first repeater device is further configured to:
transmit information to the gateway device indicating that the fall has occurred, and
wherein the information includes a location, an acceleration and an elevation change associated with the fall, and
wherein the gateway device is configured to transmit the information to a data storage device via a wireless network.

3. The system of claim 2, further comprising:
the data storage device, wherein the data storage device is configured to store measurements and fall related data associated with the fall detection pendant, and
wherein the data storage device includes at least one application and an application programming interface (API) configured to allow remote access to the stored measurements and fall related data.

4. The system of claim 3, further comprising:
a fall monitoring system configured to:
receive, from the data storage device, fall information including a location associated with the fall, and
dispatch personnel or contact the user of the fall detection pendant in response to receiving the fall information.

5. The system of claim 3, wherein the data storage device is configured to store information identifying at least two of:
a location of the fall,
a type of fall,
a severity associated with the fall,
at least one of an acceleration or elevation change associated with the fall,
at least one of an angle or orientation of the fall,
whether the fall is in a forward direction or a backward direction,
whether the user has fallen one or more other times within a period of time, or
details associated with the user.

6. The system of claim 1, wherein the fall detection pendant includes a battery, wherein the battery is configured to:
continuously provide power to the accelerometer and pressure sensor, and
not provide power to other components of the fall detection pendant until at least one of an acceleration change is detected by the accelerometer or a pressure change is detected by the pressure sensor.

7. The system of claim 1, wherein the first repeater device is configured to:
signal the coordinator device and a gateway device indicating that the fall has occurred.

8. The system of claim 1, further comprising:
a data storage device configured to:
receive data from the fall detection pendant, and
store information identifying a type of alarm received from the fall detection pendant and information identifying the location of the fall detection pendant.

9. The system of claim 1, wherein when the processing logic is further configured to at least one of:
examine measurements from the accelerometer or pressure sensor over a period of time, or
examine components of the acceleration.

10. The system of claim 9, wherein when the fall detection pendant is at least one of examining the measurements from the accelerometer or pressure sensor over a period of time or examining components of the acceleration, the processing logic is configured to:
examine components of the acceleration in three directions with respect to the fall detection pendant to identify movement of the fall detection pendant not associated with a fall.

11. The system of claim 1, wherein when determining whether a fall has occurred, the processing logic is configured to:
determine, based on measurements from the accelerometer and pressure sensor, whether an acceleration greater than a first value has been detected,
determine, based on measurements from the pressure sensor, whether an elevation change or barometric pressure change greater than a second value has been detected,
determine that no fall has occurred or the user has gotten up from a possible fall based on the measurement from the pressure sensor at the first time, and identify that the fall has occurred in response to determining that the acceleration greater than the first value has been detected, that the elevation change or barometric pressure change greater than the second value has been detected, and that the measurement from the pressure sensor at the first time is greater than a third value.

12. A method, comprising:

measuring, by a fall detection pendant configured to be worn by a user, acceleration;

measuring, by the fall detection pendant, barometric pressure;

identifying, by the fall detection pendant, a fall event based on the measured acceleration and barometric pressure;

determining, by the fall detection pendant and based on the fall event, whether a fall has occurred;

forwarding, by the fall detection pendant and to a first receiver device, in response to determining that a fall has occurred, information indicating that the fall has occurred;

transmitting, by the first receiver device and to at least one of a repeater device or a coordinator device, an indication that the fall has occurred;

receiving, by a first one of a plurality of locator devices and from the fall detection pendant via a wireless medium, a signal that includes an identifier associated with the fall detection pendant, wherein each of the plurality of locator devices is associated with a particular location;

transmitting, by the first locator device and to the first receiver device, information indicating a location of the fall detection pendant based on the particular location associated with the first locator device;

examining the barometric pressure at a first time after expiration of a predetermined period of time after the fall event has occurred; and determining, based on the barometric pressure at the first time, whether the fall event represents an erroneous pressure reading.

13. The method of claim 12, further comprising:

determining that the user has gotten up from a possible fall or that no fall occurred based on the barometric pressure at the first time;

not forwarding, by the fall detection pendant, information indicating that the fall has occurred in response to determining that the user has gotten up from a possible fall or that no fall occurred;

transmitting, by the first receiver device, fall related data indicating that a fall occurred to a gateway device, wherein the fall related data includes a location, an acceleration and an elevation change associated with the fall; and transmitting, by the gateway device and via a wireless network, the fall related data to a fall data storage device.

14. The method of claim 13, further comprising:

storing, by the fall data storage device, the fall related data; and providing, by the fall data storage device, an application programming interface (API) configured to allow remote access to the stored measurements and fall related data.

15. The method of claim 14, wherein the storing fall related data comprises storing information identifying at least two of:

a location of the fall, a type of fall, a severity associated with the fall, at least one of an acceleration or elevation change associated with the fall, at least one of an angle or orientation of the fall, whether the fall is in a forward direction or a backward direction, whether the user has fallen one or more other times within a period of time, or details associated with the user.

16. A system comprising:

a fall detection pendant configured to be worn by a user, wherein the fall detection pendant is configured to determine whether a fall by the user has occurred, and wherein the fall detection pendant includes a pressure sensor;

a first repeater device configured to:

receive information from the fall detection pendant indicating that a fall has occurred, and signal at least one of a second repeater device or a coordinator device that the fall has occurred;

a plurality of locator devices, wherein each of the plurality of locator devices is associated with a particular location, and wherein a first one of the plurality of locator devices is configured to:

receive, from the fall detection pendant, a signal that includes an identifier associated with the fall detection pendant, and transmit, to the first repeater device, information indicating a location of the fall detection pendant, based on the location associated with the first locator device;

a coordinator device configured to receive the signal from the first repeater device or the second repeater device and forward information associated with the received signal to a fall monitoring system;

a gateway device configured to:

receive information from the first repeater device indicating that the fall has occurred, wherein the information includes a location, an acceleration and an elevation change associated with the fall, and transmit the received information to a data storage device via a wireless network;

the data storage device, wherein the data storage device is configured to store measurements and fall related data associated with the fall detection pendant, wherein the data storage device includes at least one application and an application programming interface (API) configured to allow remote access to the stored measurements and fall related data; and a fall monitoring system, wherein the fall monitoring system is located remotely from the gateway device and the data storage device, and is configured to receive, from the data storage device, fall information including a location associated with the fall, wherein the fall detection pendant is further configured to:

examine measurements from the pressure sensor at a first time after expiration of a predetermined time period after the fall has occurred to determine whether a pressure measured by the pressure sensor at the first time indicates that the fall represents an erroneous pressure reading.

17. The system of claim 16, wherein the fall monitoring system is further configured to:

dispatch personnel or contact the user of the fall detection pendant in response to receiving the fall information.

18. The method of claim 12, further comprising:

continuously providing power to the accelerometer and pressure sensor, and not continuously providing power to other components of the fall detection pendant.

19. The system of claim 1, wherein the processing logic is further configured to:

not transmit information to the first repeater device indicating that the fall has occurred in response to determining that the user has gotten up from a possible fall or the fall event represents an anomaly caused by an external factor and not from a fall.

20. The system of claim 16, wherein the fall detection pendant is further configured to:

determine that no fall has occurred or the user has gotten up from the fall based on the pressure measured by the pressure sensor at the first time.

* * * * *